United States Patent [19]

Bachmann

[11] 4,163,458

[45] Aug. 7, 1979

[54] DEVICE FOR SEALING A CONDUIT AGAINST THE FLOW OF LIQUID

[76] Inventor: Lothar Bachmann, P.O. Box 47, West Minot, Me. 04288

[21] Appl. No.: 778,879

[22] Filed: Mar. 18, 1977

[51] Int. Cl.² .............................................. F16K 3/36
[52] U.S. Cl. ................................... 137/240; 251/159; 251/172
[58] Field of Search ................ 137/240, 312; 251/172, 251/328, 159

[56] References Cited

U.S. PATENT DOCUMENTS

| | | | |
|---|---|---|---|
| 1,476,344 | 12/1923 | McGee | 251/172 X |
| 2,630,293 | 3/1953 | Smith | 137/240 X |
| 2,705,016 | 3/1955 | Saar | 137/240 UX |
| 3,050,077 | 8/1962 | Wheatley | 137/312 |
| 3,145,969 | 8/1964 | Von Zweck | 251/172 |
| 3,228,389 | 1/1966 | Lowe | 251/172 X |
| 3,504,883 | 4/1970 | Beck | 251/172 |
| 3,890,991 | 6/1975 | Grove | 251/172 X |
| 4,018,420 | 4/1977 | Muller | 251/172 |
| 4,022,241 | 5/1977 | Fox | 251/328 X |

Primary Examiner—Harold W. Weakley

[57] ABSTRACT

A device, such as a damper or valve, for use in closing a conduit against the flow of liquid has a chamber surrounding and opening into the conduit. A blade at one side of the conduit is movable through the chamber from a first position within a bonnet into a conduit-blocking position. Means carried by the chamber side walls surround the conduit and are between the conduit and the blade when in its first position and are operable then to coact to seal the chamber against leakage into it and to seal the blade when in its second position. At least one seal is of a type brought by fluid under pressure from a position out of the path of the blade into its sealing positions and is carried by the side wall enabling the seal to engage the blade face exposed to the fluid flow. Means are provided to deliver fluid pressure to the pressure operated seal when the blade is in either position and to relieve the pressure therein when the blade is to be moved. Means are also provided to maintain a fluid under pressure in the chamber greater than the fluid pressure in the conduit at least whenever the blade is to move from one position to another and to purge the sealing means and prevent leakage from the conduit along the path of the blade. The other of the sealing means may also be a fluid pressure operated seal and similarly controlled or it may be a resilient compressible seal or seals.

5 Claims, 7 Drawing Figures

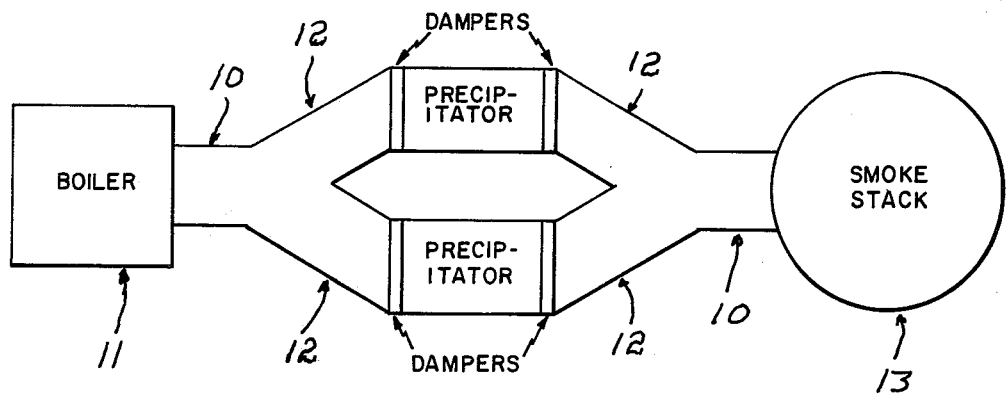
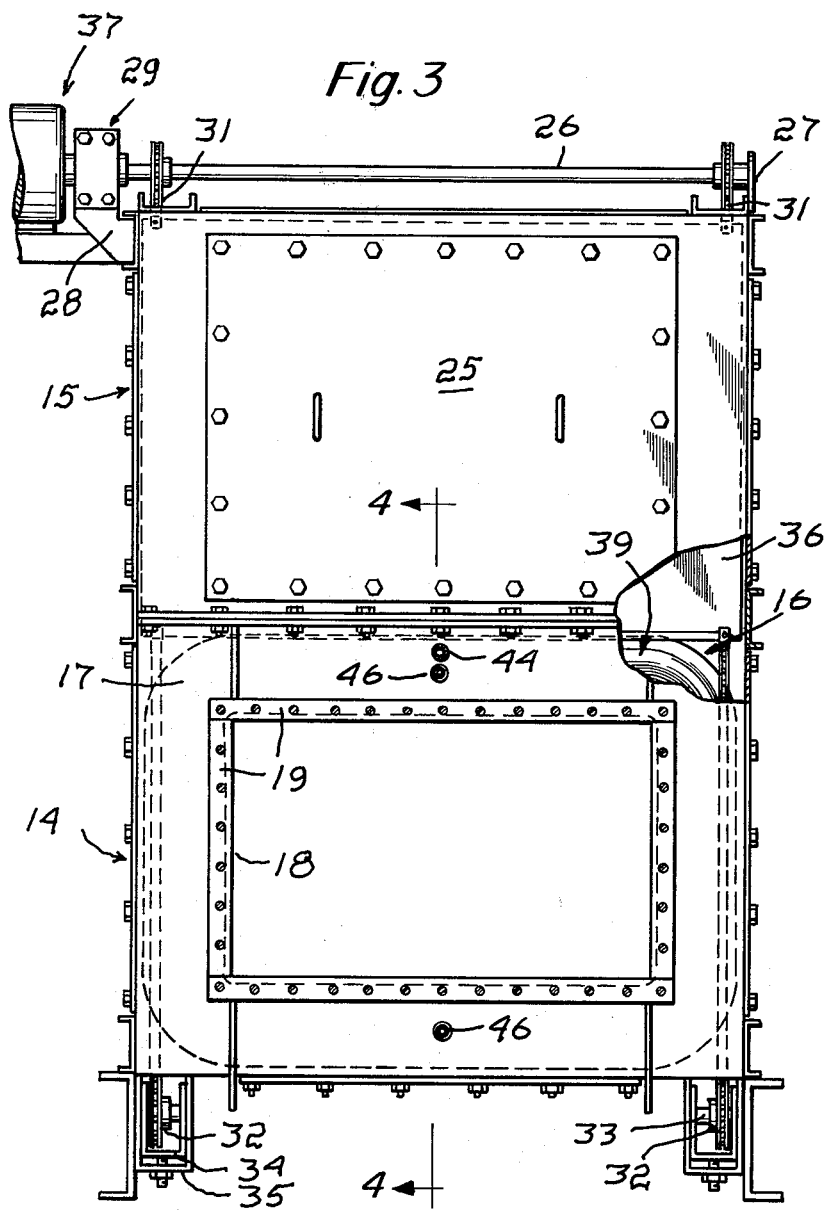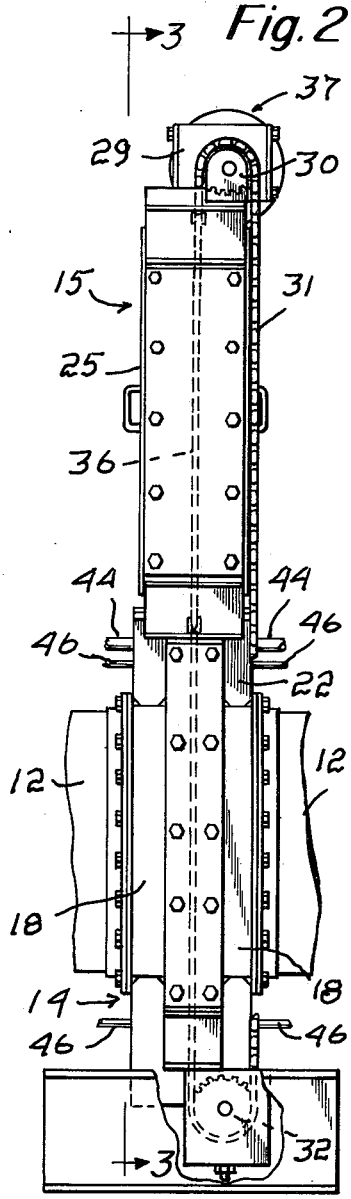

DEVICE FOR SEALING A CONDUIT AGAINST THE FLOW OF LIQUID

BACKGROUND OF THE INVENTION

While devices in accordance with the invention are well adapted for wide use in a wide range of systems, their novel features and advantages are best illustrated by thier use in such exhaust systems as those of steam-operated power plants and the like where the cross sectional dimensions of the exhaust ducts are large and the exhaust gasses must be processed as by precipitators before they can be released through a stack.

Precipitators must be serviced from time-to-time to maintain their efficiency. Exhaust ducts typically are divided to provide parallel branches with a precipitator in each of them. As each such branch duct must be opened by workmen in order that its precipitator may be serviced by workmen, means, commonly called dampers, are employed to enable the precipitators in each duct to be isolated in order to prevent the exposure of the workmen to exhaust gasses as the other branch duct or ducts must be used while a damper isolated precipitator is being serviced as otherwise the associated furnace or furnaces would have to be shut down. Many such ducts are of such dimensions that they may be entered by the workmen.

Such dampers are, except for their size, similar, in general, to gate valves in that a blade within a bonnet is advanced transversely of a duct to block flow therethrough with means provided to seal the blade. In exhaust systems of the type referred-to, the gasses are decidedly noxious and the dampers, accordingly, must insure zero percent leakage. In turn, this required that the sealing means and the blade be free of encrustment or dust and that such debris as well as fluids be prevented from entering the bonnet either to clog the mechanism or to be the source of corrosion or escaping through the bonnet unless it is sealed.

Seals for flue duct dampers are expansible and of a thin metal construction capable of withstanding heat and corrosion. As far as I am aware, the sealing seats of dampers, prior to the present invention were not themselves sealed against becoming clogged when the damper blades were in thier bonnets nor so withdrawn from the path of the blades as to ensure against injury by the blades as they were moved between their two positions.

The Present Invention

The general objective of the present invention is to provide a device such as a damper for exhaust systems or as a gate valve for various other systems that ensures zero percent leakage with minimum service requirements.

In accordance with the invention, that objective is attained with such a device including a chamber surrounding and opening into the duct or conduit. A blade mounted in a bonnet at one side of the conduit is movable through the chamber transversely of the duct between a first position outside the conduit and a second position in which it blocks the conduit. Means carried by each chamber side walls surround the conduit and are between the blade and the conduit in the first position of the blade and are operable then to coact to seal the chamber against leakage of conduit fluids or debris into it and to seal the blade when in its second position. At least one of the sealing means is a seal operated by fluid under pressure from a first position in which the blade may pass by it without injuring the seal into its sealing position against the blade or its position in which the sealing means coact to seal their seats and first seal control means are in communication with the fluid pressure operated seal to deliver fluid under pressure thereto to effect and maintain its sealing function and second control means are operative to relieve that seal from such pressure with that seal then out of the path of the blade.

A further objective of the invention is to prevent passage of conduit fluids through the sealing means while the blade is moving from one position to the other, an objective attained by the use of third control means in communication with the interior of the chamber and operable to deliver fluid thereto under a pressure that is greater than the pressure of the fluids in the conduit, at least while the position of the blade is being shifted, and desirably the third control means is also used to purge the sealing means and to blow into the exhaust duct any debris that has settled against the lower part of the sealing means.

Another important objective of the invention is to provide fluid pressure operated seals that are effective in attaining zero percent leakage in any device in accordance with the invention but are particularly well suited for use where the cross sectional area is large as it is in the case of exhaust ducts.

This objective is attained, in one embodiment of the invention, with inflatable seals each of which has two spaced blade engaging portions with an intermediate channel and with a conduit extending through the seal and opening into the channel enabling purging fluid to be delivered via the channel and permitting the channel to be pressurized while the seal is inflated if that mode of operation is desired. In practice,, such seals are formed of elastomerics, if of a type of withstanding the temperature or other potentially destructive characteristics of the exhaust gasses, flexible sheet metal, nickel alloy for a preferred example, and when for use in rectangular exhaust ducts and the like, each such inflatable seal is also generally rectangular.

With a circular duct, circular seals are used, the fluid pressure operated seal of the bellows type secured to one chamber side wall to be expanded towards the other side wall and including a circular metal head for sealing contact with the blade or the other sealing means. For most purposes the bellows are also formed from flexible stainless steel and where, as in the case of flue gasses, the fluids are corrosive, nickel allow steel is used.

While the other sealing means may also be one operated by fluid under pressure and controlled in the same manner, it may include resiliently compressible seal or seals.

It is here noted that the term "fluid" as used throughout in its broadest sense because of the wide range of systems for use in which devices in accordance with the invention are adapted and that while the preferred embodiments of the invention are exhaust systems with air under pressure used to operate the seals and to effect purging, if a system carried fluids that were or could be combustible, the purging fluid would be carbon dioxide, for one example.

Another objective of the invention is to insure that the inflatable seal or seals will not be in engagement with the blade while it is moving, an objective attained by providing means to exhaust the air therefrom, desirably with such means automatically operated whenever the blade is moved.

Yet another objective of the invention is to provide a wide range of damper control systems, an objective attained with electrically operated valves in control of fluid conduits used for seal inflation, deflation, and purging with limit switches in the leads thereto operated in response to blade travel.

BRIEF DESCRIPTION OF THE DRAWINGS

In the accompanying drawings, dampers in accordance with the invention are illustrated and FIG. 1 is a schematic view showing a divided exhaust duct with each branch provided with dampers permitting the precipitator therein to be isolated;

FIG. 2 is an end view of a damper in accordance with one embodiment of the invention;

FIG. 3 is a view thereof taken approximately along the indicated line 3—3 of FIG. 3;

The Preferred Embodiments of the Invention

Figure 4:
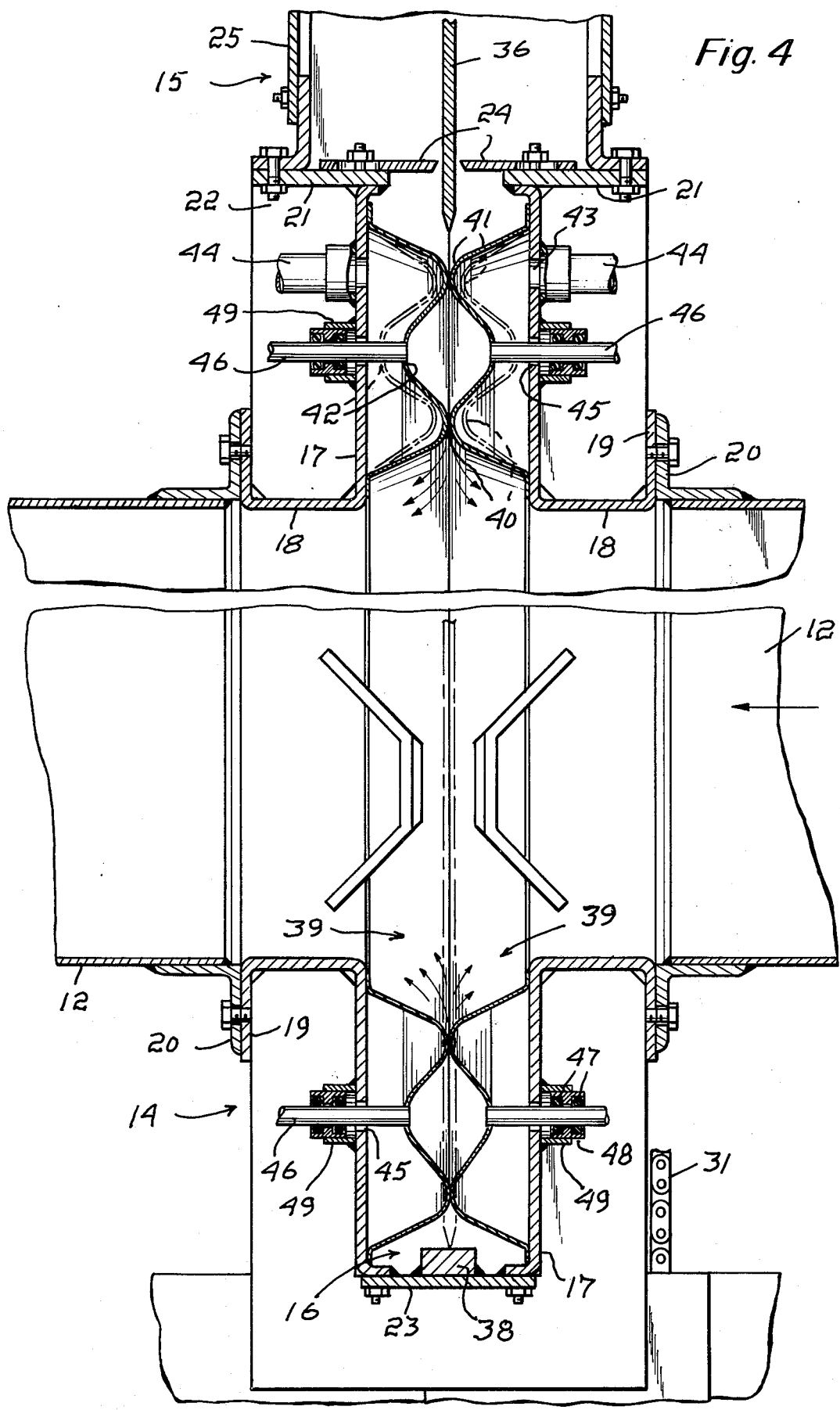
FIG. 4 is a section, on a substantial increase in scale, taken approximately along the indicated line 4—4 of FIG. 3.

The preferred embodiments of the invention are herein disclosed as dampers for use in the exhaust systems of steam operated power plants, paper mills and cement and incinerator plants, as examples of exhaust systems provided with gas processing equipment.

Where continuous plant operation is a requirement, an exhaust duct 10 from a furnace 11 is provided with branches 12 in communication with the stack 13. Each branch 12 is provided with a precipitator, for example, 40 and as such equipment must be serviced from time to time and as the exhaust gasses are noxious, it is necessary that dampers be employed in each branch 12 to so isolate it that workmen may have safe access to the equipment to be repaired or serviced with the exhaust gasses passing through the other branch duct 12. The ducts of exhaust systems of the type referred to are commonly of large size enabling workmen easily to enter therein.

Each damper in accordance with the embodiment of the invention illustrated by FIGS. 2-4 includes a base and a bonnet indicated generally at 14 and 15, respectively. The base 14 is provided with a chamber generally indicated at 16 and each of its side walls 17 has a port 18 of the size and shape of the branch ducts 12 which are shown as rectangular. Each port 18 has an end flange 19 secured to a flange 20 at the proximate end of the branch duct. Supports 21 are welded to the outer, upper ends of the side walls 17 and the side and bottom edges of the side walls are joined by end walls 22 and 23, respectively. At the upper end of the chamber 17 there are scraper blades 24.

The bonnet 14 which has removable covers 25, is supported by and secured to the supports 21 and has a shaft 26 extending lengthwise of its upper end and supported by bearings in brackets 27 and 28, the latter also supporting a gear box 29. The shaft 26 is provided with sprockets 30 with a chain 31 trained about each sprocket and the appropriate one of the sprockets 32 which are located below the chamber 16. Each sprocket 32 is mounted on a shaft 33 carried by a support 34 connected to a holder 35 for vertical adjustment relative thereto when chain tightening is required. One course of each chain 31 extends downwardly through the bonnet and the chamber 16 close to the chamber walls 22 and has one margin of the damper blade 36 secured thereto while the other course of each chain 31 is outside the base and the bonnet. The shaft 26 is shown as driven by a reversible actuator, generally indicated at 37 and including an electric motor enabling the blade 36 to be moved between its first or inoperative position within the bonnet 15 and its second, duct-blocking position in which the blade 36 rests on a cushioning block 38 on the inner surface of the chamber end wall 23.

In order that exhaust gasses may be prevented from entering the chamber 16 regardless of the position of the blade 36, each side wall 17 is provided with a seal, generally indicated at 39. Each seal 39 is inflatable and while it may be of a suitable elastomeric material, it is shown as consisting of a corrugated flexible metal sheet marginally sealed to the inner surface of a side wall 17. For duct uses, because the exhaust fluids are corrosive, a high nickel alloy in the order of .040 inches thick has proved satisfactory. The seals 39 are generally rectangular in shape in order to correspond to the size and shape of the branch ducts 12 and each is formed from lengths of such material welded to each other and to a side wall 17 as close to the ports 18 as is practicable. The corrugations establish inner and outer sealing portions 40 and 41 and an intermediate channel 42. Each side wall 17 has a port 43 opening into a seal 39 with a conduit 44 secured thereto to enable air under pressure to be delivered into that seal and inflate it, each seal, when inflated, expanding towards the other to the required extent, in the order of one-half inch, for one example, with the inflating pressures in the order of 10 P.S.I. The conduit 44 is also used to exhaust air from the seals 39 in a manner later to be detailed in order to ensure their prompt return to their normal, deflated position.

It is important to note that, with the blade 36 in its first position, when both seals 39 are inflated, their sealing portions 40 and 41 are in seated engagement and thus protect and also isolate the bonnet 15 and the blade 36 from duct fluids. When both seals 39 are deflated, they are spaced apart to permit the blade 36 to enter and pass between them into its second position then to be engaged by the seals 39 when again inflated.

Each side wall 17 is also provided with top and bottom ports 45, each freely receiving a conduit 46 extending through the associated seal 39 and opening into its channel 42. The conduits 46 are for use in delivering air into the channels 42 under a pressure higher than that of the fluid in the exhaust system in order to purge the seals 39 of any debris thereon, and also to provide a barrier against the entry of duct gasses into the chamber along the path of the blade 36 when the air pressure in the seals 39 is relieved as it is when the blade 36 is to be moved from one position to the other. Each conduit 46 extends through axially spaced O-rings 47 secured in a carrier 48 threaded in a holder 49 on the outside of the associated side wall 17 whereby the ports 45 are effectively sealed while still permitting slight axial movement of the conduits 46 which are sealed to the seal-forming corrugated metal sheet.

In use, the seal 39 are maintained inflated until the blade 36 is to be moved from within the bonnet into its ductblocking position. When the blade 36 is to be moved, the pressure in each seal 39 is relieved so that the advancing blade may pass freely between them. While it is desirable to maintain air under pressure within the channels 42 while the seals 39 are in mutual contact and while they are in engagement with the blade 36, it is necessary, when the blade 36 is moving from one position to another to deliver air through the conduits 46 whenever it is desired to block the flow of duct gasses outwardly between the seals. When the blade 36 reaches its duct-blocking position, the seals 39 are again inflated until the blade is to be returned, the above procedure being then repeated.

While the inflation of the seals and their deflation and the delivery of seal purging air may be accomplished by manually operated controls the means for moving of the blade 36 manually operated, the use of a reversible drive is preferred as is automatic operation of seal inflation and deflation and control of the seal-purging fluid.

Figure 7:
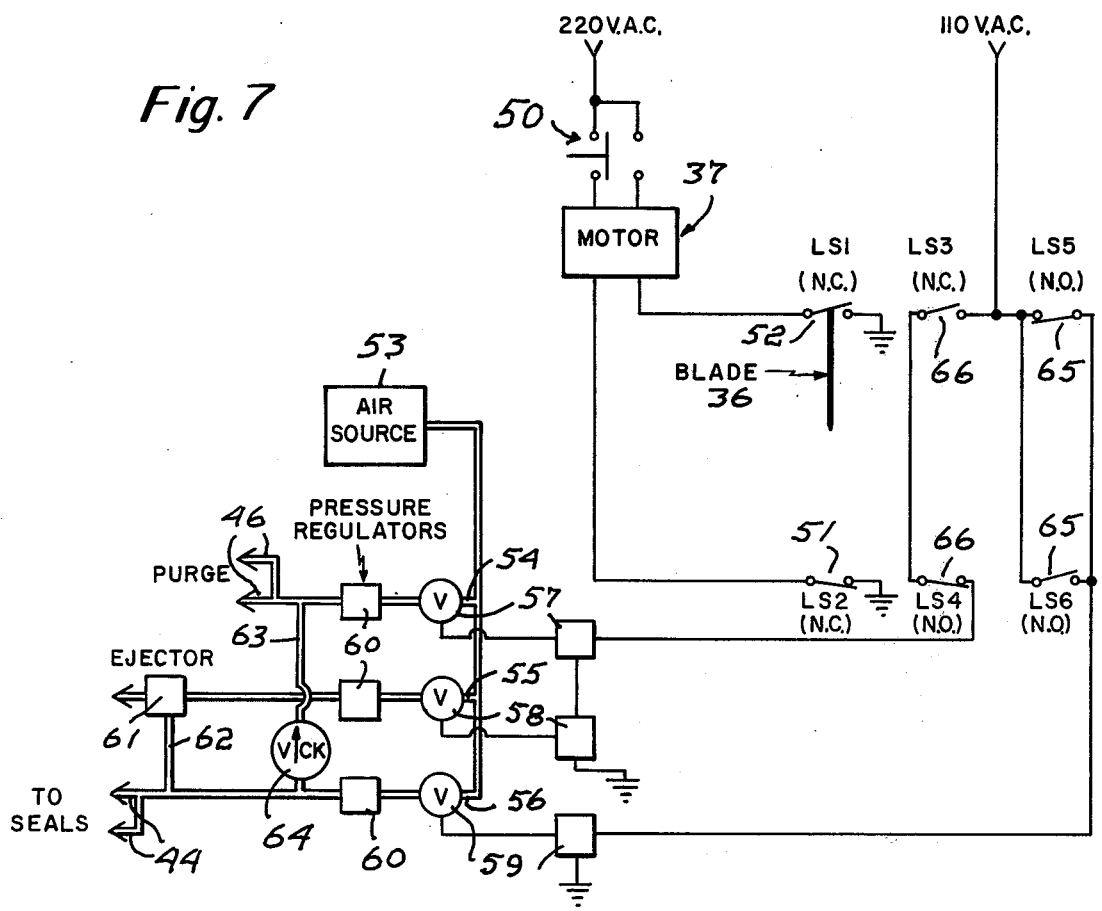
FIG. 7 is a schematic view of a damper control system.

The control system schematically illustrated in FIG. 7 provides a switch 50 by which the reversible drive 37 may be operated, in one direction, to lower the blade 36 until, when it is in its duct-blocking position, the normally closed limit switch 51 is opened, and in the other direction, to raise the blade 36 until it is again in the bonnet 15 and the normally closed limit switch 52 opened.

In the control of the damper, the fluid is air under pressure from a source indicated at 53 and is delivered through conduits 54, 55, and 56 provided with normally closed, electrically operated valves 57, 58, and 59, respectively, and each conduit includes a pressure regulator 60. The purge conduits 46 are connected to the conduit 54, an ejector 61 is operated by air delivered thereto by the conduit 55 and each conduit 44 is connected to the conduit 56 as is the intake 62 of the ejector. It will be noted that the conduits 54 and 56 are interconnected by a conduit 63 provided with a check valve 64 enabling air at pressure used to inflate the seals 39 to be delivered to the channels 42 and air at a higher pressure to be used when the seals 39 are deflated.

The electrically operated valve 59 is opened whenever either one of the normally open limit switches 65 is closed as each is when the blade 36 is in either one of its two positions. The valves 57 and 58 are both energized and opened whenever the two normally closed limit switches 66 are closed as they are except when the blade 36 is in either one of its two positions.

From the foregoing, it will be apparent that dampers in accordance with the invention are well adapted to meet a wide range of operating requirements in various systems and to ensure, regardles of size, zero percent leakage as there are two sealing portions in engagement with each face of the blade 36 or with the corresponding portions of the other seal and effective means purge the seals and block flow of gasses into the chamber 16 between the seals 39 along the path of the blade 36 while it is moving from one position to the other thereby always isolating the bonnet from the duct.

Figure 5:
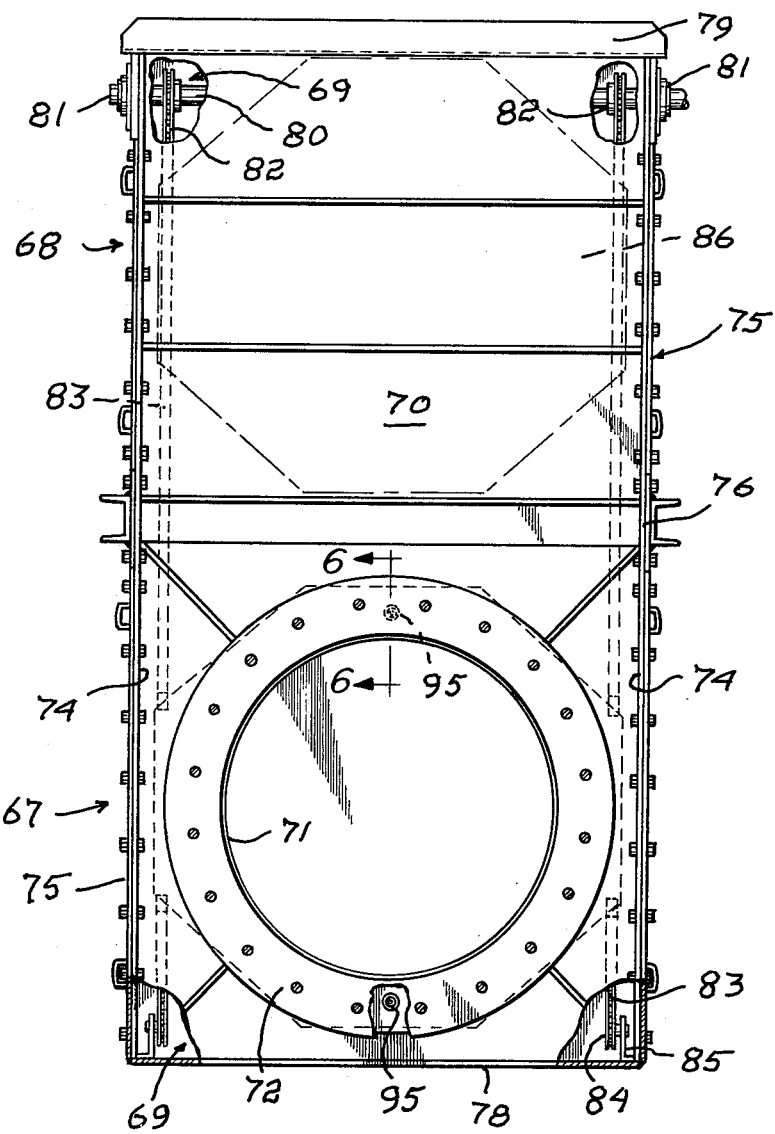
FIG. 5 is an end view of a damper in accordance with another embodiment of the invention.
Figure 6:
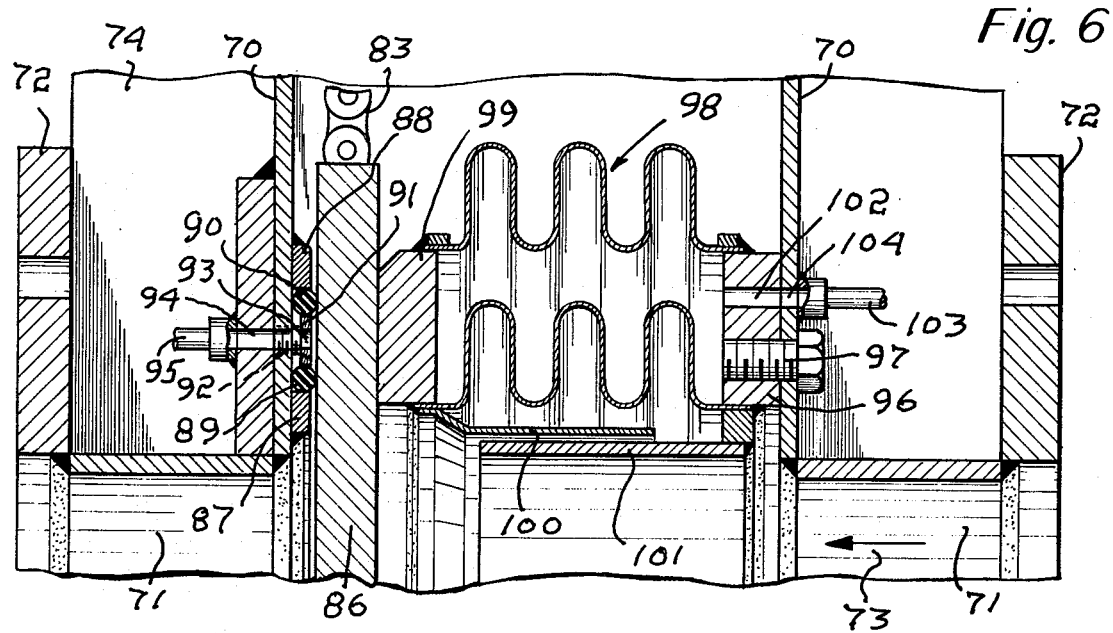
FIG. 6 is a section, on an increase in scale taken approximately along the indicated line 6—6 of FIG. 5.

In the embodiment of the invention illustrated by FIGS. 5 and 6, the damper has its base generally indicated at 67 and its bonnet generally indicated at 68. The damper has a chamber, generally indicated at 69 defined by externally reinforced walls 70 having aligned cylindrical ports 71, each having an end flange 72 to which the flanged end of a duct (not shown) is to be secured. The direction of flow through the ports is indicated by the arrow 73 in FIG. 6. Each wall 70 has flanges 74 to which removable covers 75, an intermediate reinforced section 76 and an upper section 77 are attached. The bottom of the chamber 69 is closed by a plate 78 welded thereto and its upper end is closed by a cap 79 that is welded to the walls 70 and their flanges 74 whereby the chamber 69 is closed except for the ports 71.

A shaft 80, supported by bearings 81, extends through the upper end of the chamber 69 and is adapted to be rotated in either direction, preferably by a drive such as is shown in FIG. 2. The shaft 80 has sprockets 82 each of which has a chain 83 trained about it and the appropriate one of the sprockets 84 supported by mounts 85 at the bottom of the chamber 69. The damper blade 86 has its side margins secured to the chains 83 and is adapted to be carried thereby between a first position wholly within the bonnet 68 and a second position blocking flow between the ports 71.

With the chains wholly within the chamber 69, the path of the blade is close to the wall 70 at the outfeed side of the damper to the inner surface of which are welded spaced concentric metal rings 87 and 88, the inner ring 87 close to the inner end of the associated port 71. Between the rings 87 and 88 are spaced concentric resilient, compressible ring-shaped seals 89 and 90 held abutting the rings 87 and 88, respectively, by a retaining ring 91 secured by screws 92. The seals 89 and 90 are of any commercially available type that is capable of withstanding the temperature to which they are to be exposed. The retaining ring 91 has top and bottom ports 93 with the wall 70 to which the ring 91 is attached having ports 94 in communication with the space between the rings 87 and 88 with a conduit 95 connected to the port 94 for fluid under pressure greater than that of the fluid passing through the ports 71 in order to block the flow of duct fluids into the bonnet 68 and to purge the sealing means.

The other chamber wall 70 has a metal ring 96 secured by screws 97 to its inner surface to the sides of which the inner and outer walls of the bellows 98 are secured. For duct or like uses, the bellows are formed from flexible nickel alloy steel. A metal, glade engaging ring 99 has the other ends of the inner and outer bellows walls secured thereto and includes a sleeve 100 underlying the bellows 98 and a sliding fit within a thicker sleeve 101 secured to the inner edge of the ring 96. The ring 96 has a port 102 with which a conduit 103 connected to a port 104 in the wall 70 is in communication. The conduit 103 serving to effect the delivery of fluid under pressure into the bellows 98 to effect this extension into sealing contact with the blade 86 or the compressible seals 89 and 90 or the relief of such pressure. The blade 86 is normally spaced from the seals 89 and 90 and from the ring 99 of the bellows seal when not inflated but as it is chain-supported and not otherwise confined, the expansion of the bellows seal effects its seating against the compressible seals when the blade 86 is in second position.

While the control of the fluids may be by manually operated means, the control may be effected in a manner such as that schematically shown in FIG. 5.

I claim:

1. A device such as a damper or valve for use in blocking the flow of fluid through a conduit, said device including a chamber surrounding and opening into the conduit and including side walls sealed thereto, a blade mounted at one side of the conduit for movement through the chamber transversely of the conduit between a first position outside the conduit and a second conduit-blocking position, means carried by each side wall and surrounding said conduit and between said conduit and said blade when the blade is in its first position and operable then to coact and seal the chamber against leakage through it and to engage and seal the blade when in its second position, both of said sealing means an inflatable seal operated by fluid under pressure from a first position out of the path of the blade into its sealing positions, each inflatable seal including inner and outer sealing portions sealed to the appropriate one of the chamber side walls and an intermediate channel, first seal control means to deliver fluid under pressure to said sealing portions to effect and maintain their sealing positions, second seal control means to relieve said seals of operating pressure, and third control means in communication with said intermediate channels and operable to deliver fluid thereto under a pressure that is greater than the pressure of the fluid within the conduit thereby to block the flow of the conduit fluid along the path of said blade as it moves between said positions and to purge the sealing means and blow back into the exhaust stream settled debris.

2. The device of claim 1 in which both seals consist of a corrugated sheet material marginally sealed to the chamber side walls, each side wall having first and second ports opening into the seal carried thereby, the first and second means are connected to the first port, a conduit extending through the second port and secured to said seal and opening into the channel thereof, said third means in communication with said conduit, and means through which said conduit extends and sealing said second port while enabling said conduit to move relative thereto.

3. A device such as a damper or valve for use in blocking the flow of fluid through a conduit, said device including a chamber surrounding and opening into the conduit and including side walls sealed thereto, a blade mounted at one side of the conduit for movement through the chamber transversely of the conduit between a first position outside the conduit and a second conduit-blocking position, means carried by each side wall and surrounding said conduit and between said conduit and said blade when the blade is in its first position and operable then to coact and seal the chamber against leakage through it and to engage and seal the blade when in its second position, at least one of said sealing means an inflatable seal operated by fluid under pressure from a first position out of the path of the blade into its sealing positions, said inflatable seal including a series of flexible lengths of an appropriate material sealed one to another, each length corrugated to provide the seal with inner and outer sealing portions and an intermediate channel, the remote margins of the sealing portions sealed to the chamber side wall that enables the sealing portions to engage the side of the blade exposed to the fluid flow, first seal control means to deliver fluid under pressure to said sealing portions to effect and maintain their sealing positions, second seal control means to relieve said seals of operating pressure, and third control means in communication with said intermediate channel and operable to deliver fluid thereto under a pressure that is greater than the pressure of the fluid within the conduit thereby to block the flow of the conduit fluid along the path of said blade as it moves between said positions and to purge the sealing means and blow back into the exhaust stream settled debris.

4. The device of claim 3 in which the sheet material is a high nickel alloy.

5. The device of claim 3 in which said one sealing means is the inflatable seal and the third means opens into the channel.

* * * * *